US012561832B2

(12) United States Patent
Schmidt et al.

(10) Patent No.: US 12,561,832 B2
(45) Date of Patent: Feb. 24, 2026

(54) METHOD, DEVICE AND COMPUTER PROGRAM FOR DETERMINING THE POSITION OF A SPACECRAFT IN SPACE

(71) Applicant: JENA-OPTRONIK GMBH, Jena (DE)

(72) Inventors: Uwe Schmidt, Buergel (DE); Reinhard Berger, Jena (DE); Olivier Ballereau, Jena (DE); Thomas Kuehn, Jena (DE)

(73) Assignee: JENA-OPTRONIK GMBH (DE)

( * ) Notice: Subject to any disclaimer, the term of this patent is extended or adjusted under 35 U.S.C. 154(b) by 61 days.

(21) Appl. No.: 18/713,278

(22) PCT Filed: Nov. 29, 2022

(86) PCT No.: PCT/EP2022/083617
§ 371 (c)(1),
(2) Date: Jun. 13, 2024

(87) PCT Pub. No.: WO2023/099449
PCT Pub. Date: Jun. 8, 2023

(65) Prior Publication Data
US 2025/0322539 A1    Oct. 16, 2025

(30) Foreign Application Priority Data
Nov. 30, 2021    (DE) ..................... 10 2021 131 490.9

(51) Int. Cl.
*G06T 7/70*        (2017.01)
*G06T 5/77*        (2024.01)
(Continued)

(52) U.S. Cl.
CPC .................. *G06T 7/70* (2017.01); *G06T 5/77* (2024.01); *H04N 23/667* (2023.01); *H04N 23/90* (2023.01); *G06T 2207/10032* (2013.01)

(58) Field of Classification Search
None
See application file for complete search history.

(56) References Cited

U.S. PATENT DOCUMENTS

| | | | |
|---|---|---|---|
| 2015/0041595 A1* | 2/2015 | Hartmann .............. | B64G 1/361 |
| | | | 244/158.8 |
| 2019/0253647 A1* | 8/2019 | Park ...................... | H10F 39/024 |

(Continued)

FOREIGN PATENT DOCUMENTS

| | | |
|---|---|---|
| DE | 102012000331 A1 | 7/2013 |
| DE | 102013108711 A1 | 2/2015 |

(Continued)

OTHER PUBLICATIONS

European Patent Office; Search Report in related International Patent Application No. PCT/EP2022/083617 dated Apr. 3, 2023; 4 pages.

(Continued)

*Primary Examiner* — Eileen M Adams
(74) *Attorney, Agent, or Firm* — Dorton & Willis, LLP

(57) ABSTRACT

A method for determining the position of a spacecraft in space includes receiving image data from a plurality of differently oriented optics modules, processing the received image data and computing a position, a rate of rotation and/or direction of rotation from the processed image data. The method may be carried out with the aid of at least one image processing module, a device for carrying out such a method, and a computer program for carrying out such a method on such a device.

22 Claims, 9 Drawing Sheets

(51) Int. Cl.
    *H04N 23/667*     (2023.01)
    *H04N 23/90*      (2023.01)

(56)           References Cited

U.S. PATENT DOCUMENTS

| | | | |
|---|---|---|---|
| 2022/0014768 A1* | 1/2022 | Wade | G06F 13/4022 |
| 2022/0265228 A1* | 8/2022 | Shimizu | G06T 1/00 |

FOREIGN PATENT DOCUMENTS

| | | |
|---|---|---|
| DE | 102020122748 B3 | 2/2022 |
| EP | 2615418 A2 | 7/2013 |

OTHER PUBLICATIONS

Majewski L et al.; "Hydra multiple head star sensor and its in-flight self-calibration of optical heads alignment"; Proceedings of SPIE; [Proceedings of SPIE ISSN 0277-786X vol. 10524], SPIE, US, vol. 10566, Nov. 21, 2017 (Nov. 21, 2017), pp. 105660T-105660T; DOI: 10.1117/12.2308228; ISBN: 978-1-5106-1533-5. XP060096185; abstract, chapters 1-4, figures 1-5.

Uwe Schmidt; "Intelligent error correction method applied on active pixel sensor based star tracker"; Advances in Optical Thin Films II. Edited By Amra, Claude; Kaiser, Norbert; Macleod, H. Angus. Proceedings of the SPIE, vol. 5964, Oct. 1, 2005 (Oct. 1, 2005), pp. 154-161; XP040210482; abstract, chapters 1, 2 and 4.

Anup Katake; "StarCam SG100: A high update rate, high sensitivity stellar gyroscope for spacecraft"; Information Fusion, 202. Proceedings of the Fifth International Conference on Jul. 8-11, 2002, Piscataway, NJ, USA, IEEE, Jul. 8, 202 (Jul. 8, 202), pp. 235-242; vol. 1; DOI: 10.1109/ICIF.2002. 1021156; ISBN: 978-0-9721844-1-0; XP040547464; the whole document.

Quang Lam et al.; "Noise estimation for star tracker calibration and enhanced precision attitude determination"; Information Fusion, 2002. Proceedings of the Fifth International Conference on Jul. 8-11, 2002, Piscataway, NJ, USA, IEEE Jul. 8, 202 (Jul. 8, 202), pp. 235-242; vol. 1; DOI: 10.1109/ICIF.2002.1021156; ISBN: 978-0-9721844-1-0; XP032457277; the whole document.

German Patent Office; Office Action in related German Patent Application No. 10 2021 131 490.9 dated Sep. 27, 2022; 9 pages.

* cited by examiner 116,122

150

108,110,112,116,118,120,122

150

108,110,112,116,118,120,122

150

108,110,112,116,118,120,122

150

METHOD, DEVICE AND COMPUTER PROGRAM FOR DETERMINING THE POSITION OF A SPACECRAFT IN SPACE

CROSS-REFERENCE TO RELATED APPLICATIONS

This application is a national phase application under 35 U.S.C. § 371 of International Patent Application No. PCT/EP2022/083617, filed Nov. 29, 2022 (pending), which claims the benefit of priority to German Patent Application No. DE 10 2021 131 490.9, filed Nov. 30, 2021, the disclosures of which are incorporated by reference herein in their entirety.

TECHNICAL FIELD

The invention relates to a method for determining the position of a spacecraft in space. The invention also relates to a device for determining the position of a spacecraft in space. The invention also relates to a computer program for determining the position of a spacecraft in space.

BACKGROUND

The document DE 10 2012 000 331 A1 discloses a method for determining the position of a flying object using a sensor system with a plurality of star sensors, each of which detects constellation sections by means of an optical system and a light-sensitive matrix detector, with the same or different fields of view, different viewing directions and an evaluation device for computing position information of the flying object based on a comparison of the detected constellation sections with a star catalog, wherein the star sensors are in signal connection with one another via a bus system and exchange data via the bus system to improve the measurement accuracy.

The document DE 10 2013 108 711 A1 discloses a position and orbit control system of a spacecraft for a spacecraft containing: a star sensor with an optical camera head and a processor unit, which is provided as a central master processor unit; further kinematic sensors, each with a sensor element and a processor unit, wherein one of the further processor units is equivalent to the processor unit and is nominated as a central redundant processor unit; a first bus, which connects the further kinematic sensors to the central processor units; a synchronization line from the respectively active central processor unit to the further kinematic sensors for providing a uniform time clock; a connection of the central processor units to a second bus of the spacecraft, via which the respectively active central processor unit supplies a central computer of the spacecraft with hybridized kinematic measurement data, which are generated from the synchronous kinematic measurement data of the star sensor and measurement data of the other sensors according to a method for hybridization.

The document DE 10 2020 122 748 B3 disclosed a method for determining the position of a spacecraft in space, wherein the steps: cyclically repeatedly recording distorted constellations, processing the distorted constellations into distorted star group data, storing the distorted star group data; determining a current rate of rotation by comparing the distorted star group data of two consecutive cycles; determining a current rate of rotation by comparing the distorted star group data of two consecutive cycles; transmitting the current rate of rotation to a position control system and/or the steps: processing the distorted constellations of a current cycle to create rectified star group data; determining position information by assigning the rectified star group data to carried star group catalog data; transmitting the position information to the position control system.

SUMMARY

The invention is based on the object of structurally and/or functionally improving a method mentioned at the beginning. The invention is also based on the object of structurally and/or functionally improving a device mentioned at the outset. In addition, the invention is based on the object of structurally and/or functionally improving a computer program mentioned at the beginning.

The object is achieved with a method, a device, and a computer program as disclosed herein. The method, device and/or computer program can also be referred to as a stellar gyro.

The method can be used for optical or optics-based position determination. The method can be used for exclusively optical or optics-based position determination. The method can be used to determine a position without the need for gyroscopes or gyroscopic instruments. The method can be carried out on a spacecraft. The spacecraft can be a rocket, an artificial satellite, a space probe, a space shuttle, a spaceship, a space capsule, a space station or a space telescope. The spacecraft can have at least one electrical control device. The spacecraft can be a highly dynamic spacecraft, in particular with rates of rotation of up to 15 or 20 degrees/sec.

The image data can represent information of an image. The image can contain pixels or image elements. The image can contain light or white image elements on a dark or black background. The bright or white image elements can show stellar objects or can be based on disturbances, in particular from solar eruptions. Solar eruptions can also be referred to as "solar flares." The image data can be received in binary form. The image data can be received as an electrical and/or optical signal. The image data can be received via interfaces. The image data of an optics module can be received via a separate interface. The image data of an optics module can be received via a plurality of separate interfaces. The received image data can be processed using information technology. The position, the rate of rotation and/or the direction of rotation can be computed from the processed image data using information technology. Steps a), b) and c) can be carried out in the specified order. At least one further step can be carried out prior to step a). At least one further step can be carried out between steps a) and b) and/or between steps b) and c). After step c), at least one further step can be carried out. Steps a), b) and/or c) can be carried out for each of the differently oriented optics modules. Thus, a position, a rate of rotation and/or a direction of rotation can be obtained for each of the differently oriented optics modules.

In step b), disturbances in the image data, in particular disturbances caused by solar eruptions, can be recognized and removed, disregarded and/or eliminated.

Steps a), b) and/or c) can be carried out in real time. Steps a), b) and/or c) can be carried out within a predetermined period of time. Steps a), b) and/or c) can be carried out in hard real time, soft real time and/or quasi-real time.

Steps a), b) and/or c) can be carried out for image data from a plurality of differently oriented optics modules with the aid of a common image processing module.

In step a), image data of a plurality of differently oriented optics modules of a first optics module subsystem and image data of a plurality of differently oriented optics modules of at least one further optics module subsystem can be received, wherein the first optics module subsystem and the at least one further optics module subsystem form a redundant overall optics module system.

Steps a), b) and/or c) can be carried out with the aid of a first image processing module with at least one integrated electronic circuit and/or with the aid of at least one further image processing module with at least one integrated electronic circuit, wherein the first image processing module and the at least one further image processing module form a redundant overall image processing module system.

Steps a), b) and/or c) can be carried out for the first optics module subsystem and the at least one further optics module subsystem both with the aid of the first image processing module and with the aid of the at least one further image processing module, so that a redundant overall system is formed.

Steps a), b) and/or c) can be carried out with the aid of an image processing module having at least one first integrated electronic circuit and at least one further integrated electronic circuit, wherein the at least one first integrated electronic circuit and the at least one further integrated electronic circuit form a redundant overall circuit system.

Steps a), b) and/or c) can be carried out with the aid of a first structurally integrated optics/image processing module and/or with the aid of at least one further structurally integrated optics/image processing module, wherein the first optics/image processing module and the at least one further optics/image processing module form a redundant overall optics/image processing module system. With the aid of the first optics/image processing module and/or with the aid of the at least one further optics/image processing module, image data from at least one external optics module can be received. An external optics module is, in particular, an optics module that is structurally separate from an optics/image processing module.

Steps a), b) and/or c) can be carried out in a full-frame mode and/or in a window mode. In full-frame mode, steps a), b) and/or c) can be carried out on the basis of full image data. Full image data can be image data based on a high number of sensor elements of an optics module compared to sectional image data, in particular on an at least approximately maximum possible number of sensor elements. In full-frame mode, a position, rate of rotation and/or direction of rotation can be computed initially. The initial computation of the position, the rate of rotation and/or the direction of rotation can be used for calibration. In window mode, step c) can be carried out on the basis of sectional image data. Sectional image data can be image data based on a small number of sensor elements of an optics module compared to full image data, in particular on only some of the existing sensor elements. In window mode, step b) can be omitted. In window mode, a position, rate of rotation and/or direction of rotation can be computed based on an initial computation by simultaneous tracking.

After an initial computation of a position, rate of rotation and/or direction of rotation in full-frame mode, it is possible to switch to window mode for an optics module. If simultaneous tracking is lost, the optics module can be switched back to full-frame mode.

Full-frame mode can be carried out in parallel in time for a plurality of optics modules, at least temporarily. Window mode can be carried out for at least one other of the optics modules. Full-frame mode can be carried out sequentially in time for a plurality of optics modules. Full-frame mode can be carried out for only one of the optics modules at a time. Window mode can be carried out for other optics modules.

The position, rate of rotation and/or direction of rotation computed in step c) for each of the differently oriented optics modules can be fed to a common fusion solution. The positions, rates of rotation and/or directions of rotation and/or the common fusion solution computed for the optics modules in step c) can be made available to an electrical control device of the spacecraft.

Step b) can in turn comprise the steps b1) correcting an image background, b2) binarizing a corrected background image, b3) filtering star objects and/or b4) segmenting objects.

In step b1), background noise can be estimated. In particular, dark signal non-uniformity (DSNU), fixed pattern noise (FPN) and white spots can be estimated. In step b1), systematic, time-invariant image noise can be estimated from the already processed image data with N-images in the past or estimated with the aid of constant reference images, in particular from an initial calibration. In step b1), a currently incoming full image can be corrected with the estimated background image or a reference image.

In step b2), the corrected background image can be binarized with stellar objects by applying a binarization threshold. In step b2), a binary image can be stored continuously in a binary image buffer of length K, in particular with 0=background pixel, 1=object pixel.

In step b3), a logical AND operation can be carried out pixel by pixel via a binary image buffer of length K. In step b3), pixels that are object pixels in the K instances can be assigned to stellar objects. These pixels can be marked with the logical value 1 and/or designated as stellar object pixels. In step b3), pixels that are not continuous object pixels in the K instances can be assigned to time-variant object pixels. This allows for efficient discrimination of single event upsets (SEUs), which occur particularly during solar eruptions. These pixels can be marked with the logical value 0.

In step b4), neighboring stellar object pixels (clusters) can in each case be assigned to a stellar object in an object segmentation. In step b4), the stellar objects can be stored in a stellar object list with at least their xy position, plus brightness information if applicable. The list(s) of stellar objects generated in step b4) can be used in step c).

Steps a), b) and/or c) can be carried out with the aid of a computer program. The computer program can be carried out with the aid of at least one universally programmable integrated electronic circuit, in particular with the aid of at least one processor. Steps a), b) and/or c) can be carried out with the aid of at least one functionally programmable integrated electronic circuit, in particular with the aid of at least one field programmable gate array (FPGA). Steps a), b) and/or c) can be carried out with the aid of at least one application-specific integrated circuit (ASIC).

The computer program can be executable or executed with the aid of at least one universally programmable integrated electronic circuit, in particular with the aid of at least one processor. The computer program can be storable or stored in a data memory. The computer program can be available in installable or installed form. The computer program can exist as a computer program product. The computer program can be available on a storage medium. The computer program can also be referred to as a "data processing program" or "software."

The device can be designed for arrangement on a spacecraft. The device can have a plurality of differently oriented optics modules and at least one image processing module.

The device can also have a plurality of equally oriented optics modules. Equally oriented optics modules can form a redundant overall optics module system. The device can have a first optics module subsystem with a plurality of differently oriented optics modules. The device can have at least one further optics module subsystem with a plurality of differently oriented optics modules. The first optics module subsystem and the at least one further optics module subsystem can form a redundant overall optics module system. An optics module or optics section can also be referred to as an "optical head." A plurality of or all optics modules can also be referred to collectively as a "sensor system."

An optics module can have a viewing axis. Differently oriented optics modules can have differently oriented viewing axes. Equally oriented optics modules can have at least approximately equally oriented viewing axes. Differently oriented optics modules can be oriented to one another with a viewing axis angle of approximately 60 degrees to approximately 120 degrees, in particular with a viewing axis angle of approximately 70 degrees to approximately 110 degrees, in particular with a viewing axis angle of approximately 80 degrees to approximately 100 degrees, in particular with a viewing axis angle of approximately 90 degrees. Equally oriented optics modules can be oriented along at least approximately parallel viewing axes. A viewing axis can also be referred to as a z-axis or "line of sight."

An optics module can be an optical measuring instrument. An optics module can have at least one optics component for modifying a beam path, at least one optoelectronic sensor, at least one electronic module, at least one interface and/or a housing. The at least one optoelectronic sensor can be designed as a CMOS sensor or active pixel sensor. The at least one optoelectronic sensor can have sensor elements or pixels. The at least one interface of an optics module can be designed to output image data. The at least one interface of an optics module can be designed to receive signals from at least one image processing module. The at least one interface of an optics module can be designed to supply the optics module with electrical energy. The at least one interface of an optics module can be a bidirectional interface.

The at least one image processing module can have at least one integrated electronic circuit, at least one first interface and/or at least one second interface. The at least one first interface of the at least one image processing module can be designed for transmitting image data, signals and/or electrical energy. The at least one interface of an optics module and the at least one first interface of the at least one image processing module can be connected to one another for transmitting image data, signals and/or electrical energy. The at least one second interface of the at least one image processing module can be designed for transmitting telemetry data, telecommand data, signals and/or electrical energy. The at least one second interface of the at least one image processing module can be connectable to an electrical control device of a spacecraft for transmitting telemetry data, telecommand data, signals and/or electrical power. An image processing module or image processing section can also be referred to as an "image processing unit."

The device can have a first image processing module with at least one integrated electronic circuit. The device can have at least one further image processing module with at least one integrated electronic circuit. The first image processing module and the at least one further image processing module can form a redundant overall image processing module system.

The first optics module subsystem and the at least one further optics module subsystem can in each case be connected both to the first image processing module and to the at least one further image processing module for transmitting image data, signals and/or electrical energy, so that a redundant overall system is formed.

The device can have at least one image processing module with at least one first integrated electronic circuit and at least one further integrated electronic circuit. The at least one first integrated electronic circuit and the at least one further integrated electronic circuit can form a redundant overall circuit system.

The device can have at least one structurally integrated optics/image processing module. The at least one optics/image processing module can have at least one optics section and at least one image processing section. The at least one optics section and the at least one image processing section can be structurally fixed to one another. Moreover, the at least one optics section can correspond to an optics module described above and the at least one image processing section can correspond to an image processing module described above.

The device can have a first structurally integrated optics/image processing module. The device can have at least one further structurally integrated optics/image processing module. The first optics/image processing module and the at least one further optics/image processing module can form a redundant overall optics/image processing module system. The device can have at least one external optics module. The device can have at least one first external optics module. The at least one first external optics module and the first optics/image processing module can be connected to one another for transmitting image data, signals and/or electrical power. The device can have at least one further external optics module. The at least one further external optics module and the at least one further optics/image processing module can be connected to one another for transmitting image data, signals and/or electrical energy.

The optics section of the first optics/image processing module and the at least one external optics module from which the first optics/image processing module can receive image data can be oriented differently. The optics section of the at least one further optics/image processing module and the at least one external optics module, from which the at least one further optics/image processing module can receive image data, can be oriented differently.

The device can have at least one integrated electronic circuit. The at least one integrated electronic circuit can be designed as a universally programmable integrated electronic circuit, in particular as a processor. The at least one integrated electronic circuit can be designed as a functionally programmable integrated electronic circuit, in particular as a field programmable gate array (FPGA). The at least one integrated electronic circuit can be designed as an application-specific integrated circuit (ASIC).

The device can have a plurality of integrated electronic circuits. The integrated electronic circuits can be designed for parallel operation. The at least one application-specific integrated circuit and/or the at least one field programmable gate array (FPGA) can form a hardware process chain, in particular a processorless hardware process chain.

In summary and in other words, the invention thus provides, among other things, a stellar gyro, an optical sensor system for alignment and rates of rotation of spacecraft.

Proposed is a "stellar gyro" optical sensor system consisting of one or more image processing units (electronic unit with processor), a plurality of optical heads with a different orientation on the spacecraft (alignment angle to one another, for example >60 degrees, orthogonal arrangement is particularly optimal); this solves the glare problem of individual optical heads and the lower accuracy around the z-axis (line of sight), a data processing program for recognizing and calculating disturbances in the image data of the optical heads (such as those caused by solar flares), which runs on the one or plurality of processors, and a data processing program for quasi-real-time computation of the position (orientation) and rates of rotation of the sensor system from the preprocessed image data, which also runs on the one or more image processing units downstream of the aforementioned data processing program.

There is no need for rotation rate sensors when using this solution.

The combination of these features results in an optical sensor system with very high availability even in the case of glare of one or a subset of the existing optical heads and also at high rates of rotation, at which the star objects are smeared in a line shape at least in some image sections.

System architectures of varying complexity can be selected, depending on the orbit and dynamic requirements along with redundancy requirements to achieve reliability and availability specifications.

With the invention, a sensor system based on optical sensors is realized. A number of sensors is reduced. The availability of position and rate of rotation information even at high rates of rotation (for example, up to 15 or 20 degrees/sec) of the spacecraft, for example in a safe mode that has not yet been position-stabilized, is improved. The availability of position and rate of rotation information under disturbances, in particular due to a solar flare, is improved.

Embodiments of the invention are described in more detail below with reference to figures.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
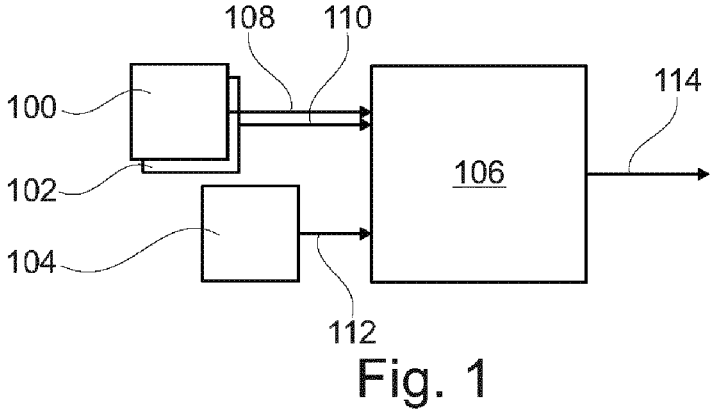
FIG. 1 schematically depicts the determination of a position of a spacecraft in space with the aid of differently oriented optics modules and an image processing module, FIG. 2 schematically depicts the processing of received image data in real time for a plurality of optics modules parallel in time, FIG. 3 schematically depicts the processing of received image data in real time for a plurality of optics modules sequentially in time, FIG. 4 schematically depicts the processing of received full image data in real time in detail, FIG. 5 schematically depicts the processing of received image data with the aid of software and processors, FIG. 6 schematically depicts the processing of received image data with the aid of a hardware process chain, FIG. 7 schematically depicts the processing of received image data with the aid of software and processors along with a hardware process chain, FIG. 8 schematically depicts a device for determining the position of a spacecraft in space with two differently oriented optics modules and an image processing module, FIG. 9 schematically depicts a device for determining the position of a spacecraft in space with three differently oriented optics modules and an image processing module, FIG. 10 schematically depicts a device for determining the position of a spacecraft in space with two times two differently oriented redundant optics modules and two redundant image processing modules, FIG. 11 schematically depicts a redundant device for determining the position of a spacecraft in space with two times two differently oriented redundant optics modules and an image processing module with redundant integrated electronic circuits, FIG. 12 schematically depicts a device for determining the position of a spacecraft in space with three differently oriented and redundantly cross-connected optics modules and two redundant image processing modules, FIG. 13 schematically depicts a device for determining the position of a spacecraft in space with two differently oriented external optics modules and two redundant integrated optics/image processing modules, and FIG. 14 schematically depicts an optics module of a device for determining the position of a spacecraft in space in detail.

FIG. 1 shows a determination of the position of a spacecraft in space with the aid of optics modules 100, 102, 104 and an image processing module 106. The optics modules 100, 102, 104 have differently oriented viewing axes and are in each case connected to the image processing module 106 for transmitting image data 108, 110, 112, signals and/or electrical energy.

With the aid of the image processing module 106 and a computer program executed thereon, image data 108, 110, 112 received from the optics modules 100, 102, 104 are processed and a position, a rate of rotation and a direction of rotation of the spacecraft are computed for each of the optics modules 100, 102, 104 based thereon. The position, rate of rotation and direction of rotation computed for each of the differently oriented optics modules 100, 102, 104 is fed to a common fusion solution 114.

Figure 2:
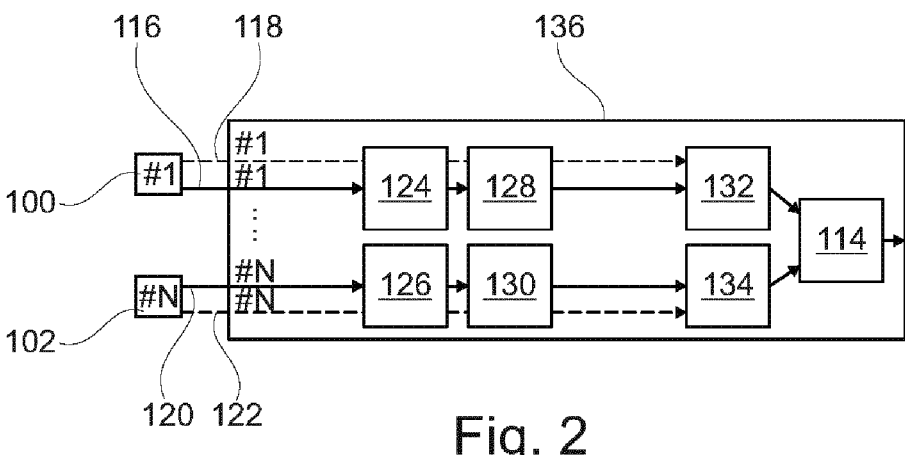

FIG. 2 shows the processing of received image data 116, 118, 120, 122 in real time for a plurality of optics modules 100, 102 parallel in time. For this purpose, a dedicated image processing module or a dedicated integrated electronic circuit is provided for each of the optics modules 100, 102, which can be combined in a circuit unit 136. For each of the optics modules 100, 102, real-time image processing is carried out parallel in time in a step 124, 126 for the received image data 116, 118, 120, 122, a list of stellar objects is generated in a subsequent step 128, 130, and a position, a rate of rotation and a direction of rotation are computed in a subsequent step 132, 134. The positions, rates of rotation and directions of rotation computed for each of the optics modules 100, 102 are fed to a common fusion solution 114.

The processing of the received image data 116, 118, 120, 122 and the computation of the position, rate of rotation and direction of rotation can be carried out in a full-frame mode or in a window mode. In full-frame mode, full image data 116, 120 is processed. In window mode, only sectional image data 118, 122 is processed. Full-frame mode is used in order to initially compute a position, rate of rotation and/or direction of rotation or in the event of a loss of tracking. Otherwise, window mode is used, in which the position, rate of rotation and direction of rotation are computed based on an initial computation by tracking.

The processing parallel in time of received image data 116, 118, 120, 122 for a plurality of optics modules 100, 102 according to FIG. 2 makes full-frame mode possible for each optics module 100, 102 independently of the other optics modules 100, 102, i.e. also simultaneously for a plurality of or all optics modules 100, 102, but requires a correspondingly high computing power.

Figure 3:
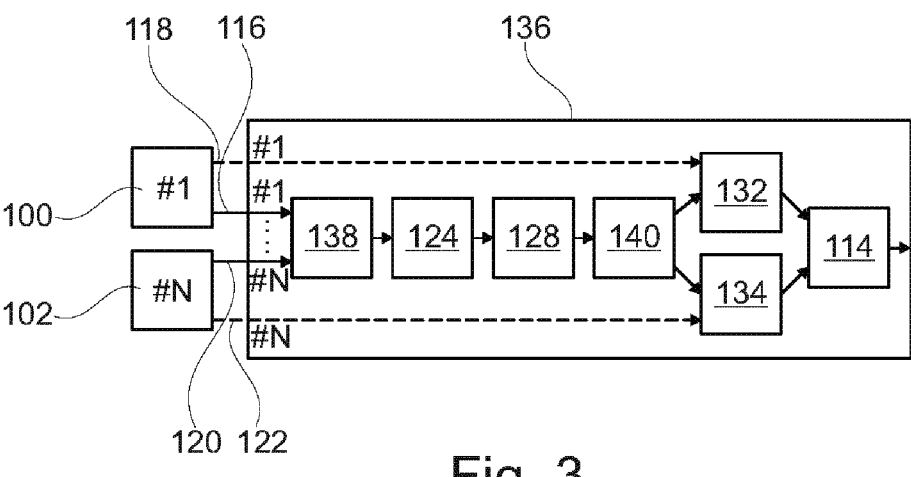

FIG. 3 shows the processing of received image data 116, 118, 120, 122 in real time for a plurality of optics modules 100, 102 sequentially in time. Full-frame mode can only ever be used for one of the optics modules 100 or 102, while only window mode is available for the other optics modules. To use full-frame mode for alternating optics modules 100 or 102, one of the optics modules 100 or 102 is first selected in steps 138, 140 according to FIG. 3. Real-time image processing is then carried out for the selected optics module 100 or 102 in a step 124, a list of stellar objects is generated in a subsequent step 128, and a position, a rate of rotation and a direction of rotation are computed in a subsequent step 132, 134. For the remaining optics modules 100, 102, the position, rate of rotation and direction of rotation are computed in window mode. The positions, rates of rotation and directions of rotation computed for the optics modules 100, 102 are fed to a common fusion solution 114. In this way, full-frame mode can be carried out sequentially in time for each of the optics modules 100, 102. The circuit unit 136 can be dimensioned to be correspondingly less powerful. In all other respects, reference is also made in particular to FIG. 2 and the associated description.

The processing sequentially in time of received image data 116, 118, 120, 122 in real time for a plurality of optics modules 100, 102 shown in FIG. 3 describes the operational case in which all optics modules are in window mode or one of the optics modules is in full-frame mode. In the initialization case, full-frame mode for the optics modules 100 and 102 according to FIG. 3 is first selected sequentially in time in steps 138, 140, in order to set the optics modules 100 and 102 to window mode one after the other.

Figure 4:
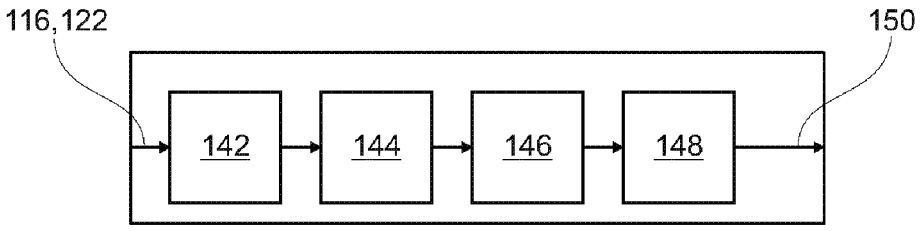

FIG. 4 shows the processing of received full image data 116, 120 in real time in detail. An image background is corrected in step 142. For this purpose, background noise is initially estimated, in particular a dark signal non-uniformity (DSNU), a fixed pattern noise (FPN) and white spots. A systematic, time-invariant, image noise from the already processed full image data 116, 120 with N-images past is estimated in a timely manner or estimated with the aid of constant reference images, in particular from an initial calibration. Current incoming full image data 116, 120 is corrected with the estimated background image or a reference image. Subsequently, in a step 144, the corrected background image is binarized with stellar objects by applying a binarization threshold. The binary image is stored in a binary image buffer of length K, in particular with 0=background pixel, 1=object pixel. Subsequently, stellar objects are filtered in a step 146 by carrying out a logical AND operation pixel by pixel via a binary image buffer of length K. Pixels that are object pixels in the K instances are assigned to stellar objects. These pixels are marked with the logical value 1 and designated as stellar object pixels. Pixels that are not continuous object pixels in the K instances are assigned to time-variant object pixels. This allows for efficient discrimination of single event upsets (SEUs), which occur particularly during solar eruptions. These pixels are marked with the logical value 0. Subsequently, the objects are segmented in a step 148 in order to generate a stellar object list. For this purpose, neighboring stellar object pixels (clusters) are in each case assigned to a stellar object in an object segmentation. The stellar objects are stored in a stellar object list with at least their xy position, plus brightness information if applicable. The list of stellar objects 150 generated in step 148 is then used to compute the position, rate of rotation and direction of rotation of the spacecraft.

Figure 5:
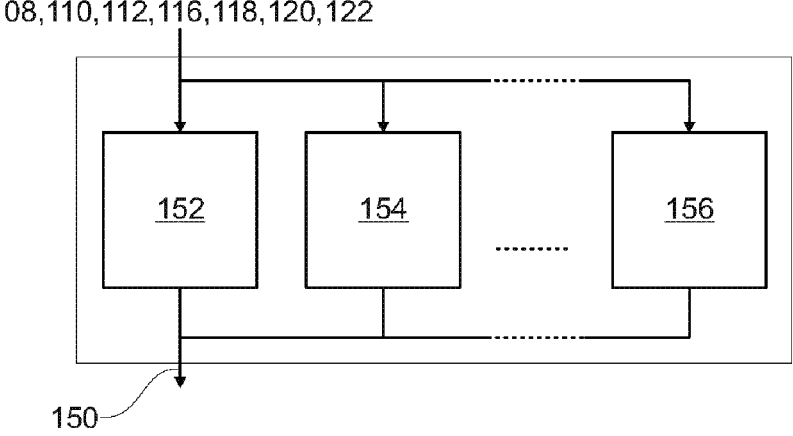

FIG. 5 shows the processing of received image data 108, 110, 112, 116, 118, 120, 122, also referred to as step b), with the aid of a computer program and processors 152, 154, 156. Received image data 108, 110, 112, 116, 118, 120, 122 is processed in real time with the aid of the computer program executed with the aid of one or more processors 152, 154, 156 until the stellar object list 150 is generated. The real-time image processing computer program executed with the aid of one or more processors 152, 154, 156 can be the same or different. The computer program is stored and executed in a shared memory/memories or in a memory/memories assigned separately to each processor. The processor(s) can be designed in each case as individual electronic components, as processor cores in one or more electronic components or as an electronic circuit in one or more application-specific integrated circuits (ASIC)/field programmable gate array (FPGA).

Figure 6:
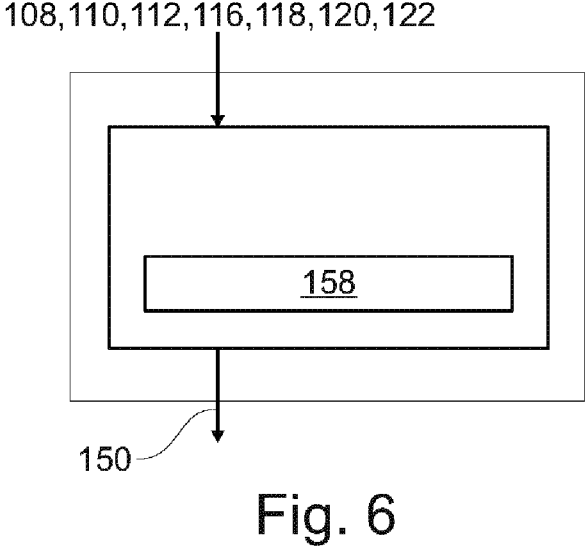

FIG. 6 shows the processing of received image data 108, 110, 112, 116, 118, 120, 122, also referred to as step b), with the aid of a processorless hardware process chain 158. Received image data 108, 110, 112, 116, 118, 120, 122 are processed in real time with the aid of a hard-wired electronic circuit, the processorless hardware process chain 158, which is located in an ASIC or an FPGA, until the stellar object list 150 is generated. Any necessary memory is located inside the ASIC/FPGA or outside as an additionally connected electronic component. The ASIC/FPGA can be designed as a single electronic component, installed in a hybrid electronic component or installed in a multi-chip module (MCM).

Figure 7:
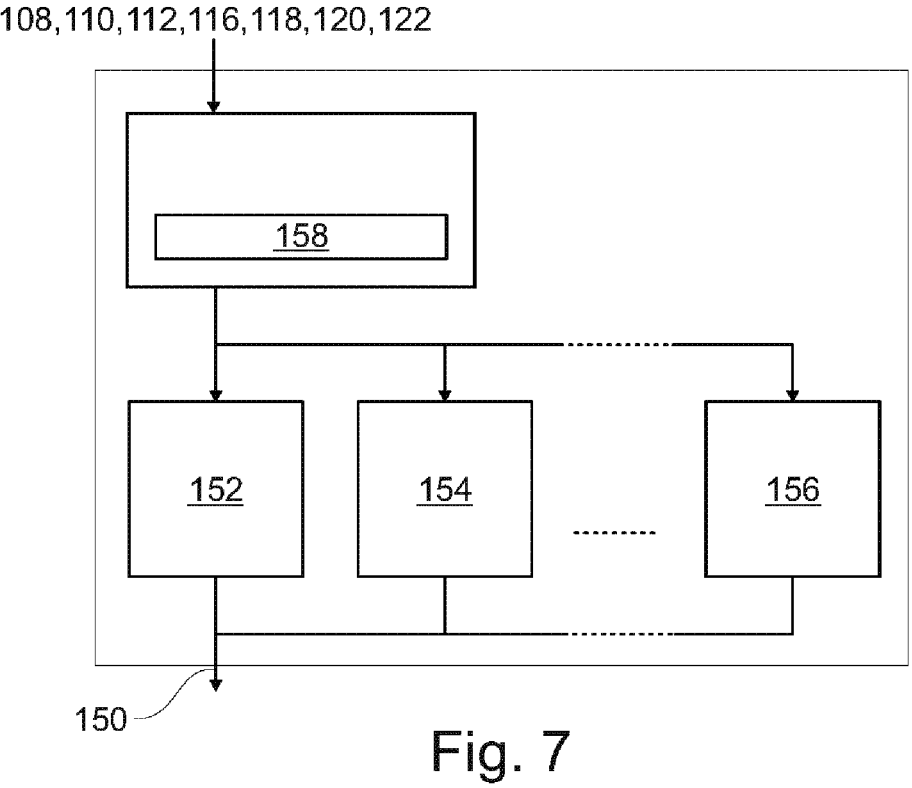

FIG. 7 shows the processing of received image data 108, 110, 112, 116, 118, 120, 122, also referred to as step b), with the aid of a computer program and processors 152, 154, 156 and a hardware process chain 158. Real-time image processing up to the generation of the stellar object list 150 is divided into hardware-based and software-based data processing. Part of this data processing is performed in a hard-wired electronic circuit, the processorless hardware process chain 158, which is located in an ASIC or an FPGA. Any necessary memory is located inside the ASIC/FPGA or outside as an additionally connected electronic component. The rest of the data processing is performed by one or more processors by means of the computer program. The computer program executed with the aid of one or more processors 152, 154, 156 can be the same or different. The computer program is stored and executed in a shared memory/memories or in a memory/memories separately allocated to each processor 152, 154, 156. Shared memories with ASIC/FPGA are possible. The ASIC/FPGA and the processor(s) 152, 154, 156 can: be designed to be installed in each case as a single electronic component, as a plurality of individual electronic components, as cores in one or more electronic components, within a hybrid electronic component or within a multi-chip module (MCM).

To compute the position, rate of rotation and direction of rotation of the spacecraft, also referred to as step c), the computation of a position solution based on the stellar object list 150 is performed via the intermediate step of star identification. This computation is effected in quasi-real time and also under the condition of high rates of rotation, so that even if the position information is lost for a short time, a new position solution is computed immediately. This method is the subject of German patent application No. 10 2020 122 748.5 filed on Aug. 31, 2020. For further structural and/or functional features of this method, reference is made to the German patent application No. 10 2020 122 748.5 filed on Aug. 31, 2020, the features of which also belong to the teaching of the present invention and which is fully incorporated into the disclosure of the present invention.

The change in position information from cycle to cycle is also used to continuously recompute the direction of rotation and rate of rotation. The position and rate of rotation values determined for each individual optics module are then fused (block fusion solution) in order to improve the accuracy of the values for the position and, in particular, for the rate of rotation. In particular, this improves the typically poorer values for the position information in the z-axis (optical axis of the optical head) for each individual optics module. For an exemplary configuration with three optics modules orthogonal to one another, for example, the following accuracies can be achieved for the position information (attitude) and rate of rotation (angular rate):

nals and/or electrical power. The interface 210 of the optics module 204 and the interface 216 of the image processing module 206 are connected to one another for transmitting image data, signals and/or electrical power. The interface 218 of the image processing module 206 is designed to transmit telemetry data and telecommand data to/from an electrical control device of the spacecraft. The interface 220 of the image processing module 206 is designed to receive electrical power to supply the image processing module 206 and the optics modules 202, 204.

The image processing module 206 receives image data, such as image data 108, 110, 112, 116, 118, 120, 122, from the optics modules 202, 204. The received image data is processed with the aid of the image processing module 206 and a position, rate of rotation and direction of rotation of the spacecraft is computed with the aid of the image processing module 206.

| 3 × ASTRO CL ⊥ | | | | | | |
|---|---|---|---|---|---|---|
| | attitude random error | | angular rate random error | | angular rate random error | |
| Angular rate [deg/sec] | xy-axis @ 8 Hz [aesec] 1σ | z-axis @ 8 Hz [aesec] 1σ | xy-axis @ 8 Hz [deg/sec] 1σ | z-axis @ 8 Hz [deg/sec] 1σ | xy-axis @ 1 Hz [deg/sec] 1σ | z-axis @ 1 Hz [deg/sec] 1σ |
| 0.004 | 0.7 | 0.8 | 0.002 | 0.002 | 0.001 | 0.001 |
| 0.1 | 0.9 | 1.0 | 0.003 | 0.003 | 0.001 | 0.001 |
| 1 | 3.5 | 3.8 | 0.011 | 0.012 | 0.004 | 0.004 |
| 2 | 8.1 | 8.9 | 0.025 | 0.028 | 0.009 | 0.010 |
| 3 | 14.4 | 15.9 | 0.045 | 0.050 | 0.016 | 0.018 |
| 5 worst case RotAxis | 25.0 | 150.0 | 0.079 | 0.471 | 0.028 | 0.167 |
| up to 15 for any STR z-Axis | 25.0 | 150.0 | 0.079 | 0.471 | 0.028 | 0.167 |

In summary, the output variables when computing the position, rate of rotation and direction of rotation of the spacecraft are quaternions per optics module, rates of rotation and directions of rotation per optics module and fused solutions for quaternions, rates of rotation and directions of rotation. In advantageous embodiments, these values are output at a frequency of between 4 and 16 Hz, preferably 8 Hz, on a data interface to the spacecraft.

Figure 8:
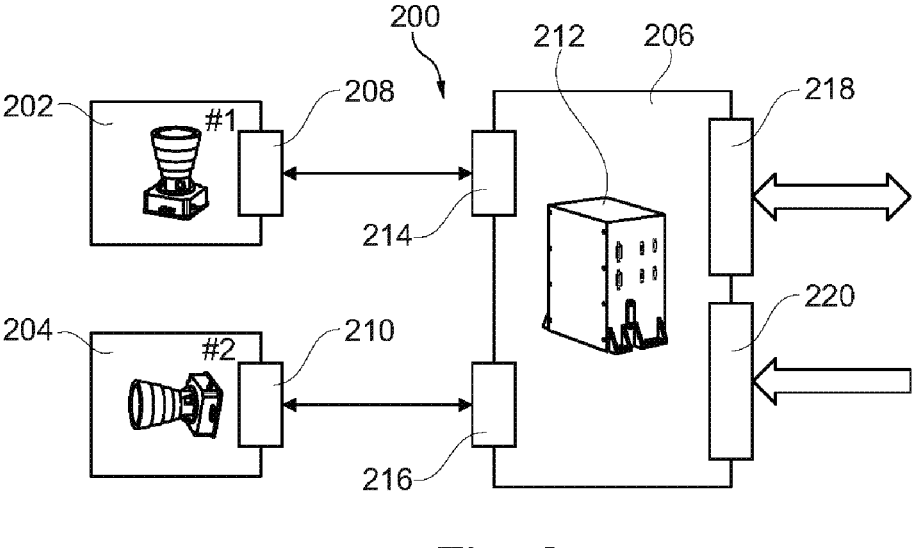

FIG. 8 shows a device 200 for determining the position of a spacecraft in space with two differently oriented optics modules 202, 204 and an image processing module 206.

The optics module 202 has optics components for modifying a beam path, an optoelectronic sensor, an electronic module, an interface 208 and a housing. The optics module 204 has optics components for modifying a beam path, an optoelectronic sensor, an electronic module, an interface 210 and a housing. The viewing axes of the optics modules 202, 204 are oriented to one another with an angle of >60 degrees, in particular with a viewing axis angle of approximately 90 degrees.

The image processing module 206 has at least one integrated electronic circuit 212 and interfaces 214, 216, 218, 220. The at least one integrated electronic circuit 212 is designed as a processor or as a hardware process chain with an application-specific integrated circuit and/or a field programmable gate array (FPGA).

Figure 9:
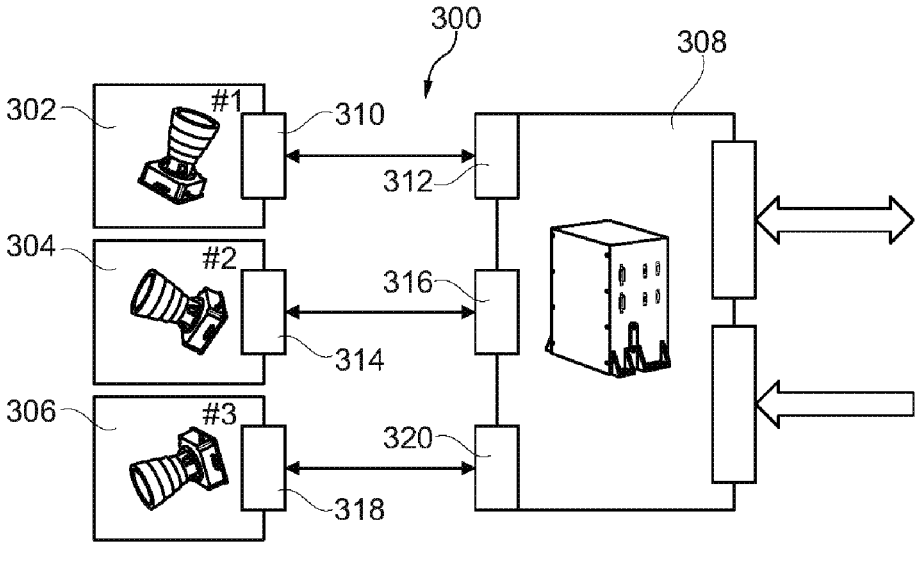

The interface 208 of the optics module 202 and the interface 214 of the image processing module 206 are connected to one another for transmitting image data, sig- FIG. 9 shows a device 300 for determining the position of a spacecraft in space with three differently oriented optics modules 302, 304, 306 and an image processing module 308. An interface 310 of the optics module 302 and an interface 312 of the image processing module 308 are connected to one another for transmitting image data, signals and/or electrical power. An interface 314 of the optics module 302 and an interface 316 of the image processing module 308 are connected to one another for transmitting image data, signals and/or electrical power. An interface 318 of the optics module 302 and an interface 320 of the image processing module 308 are connected to one another for transmitting image data, signals and/or electrical power. In all other respects, reference is also made in particular to FIG. 7 and the associated description.

Figure 10:
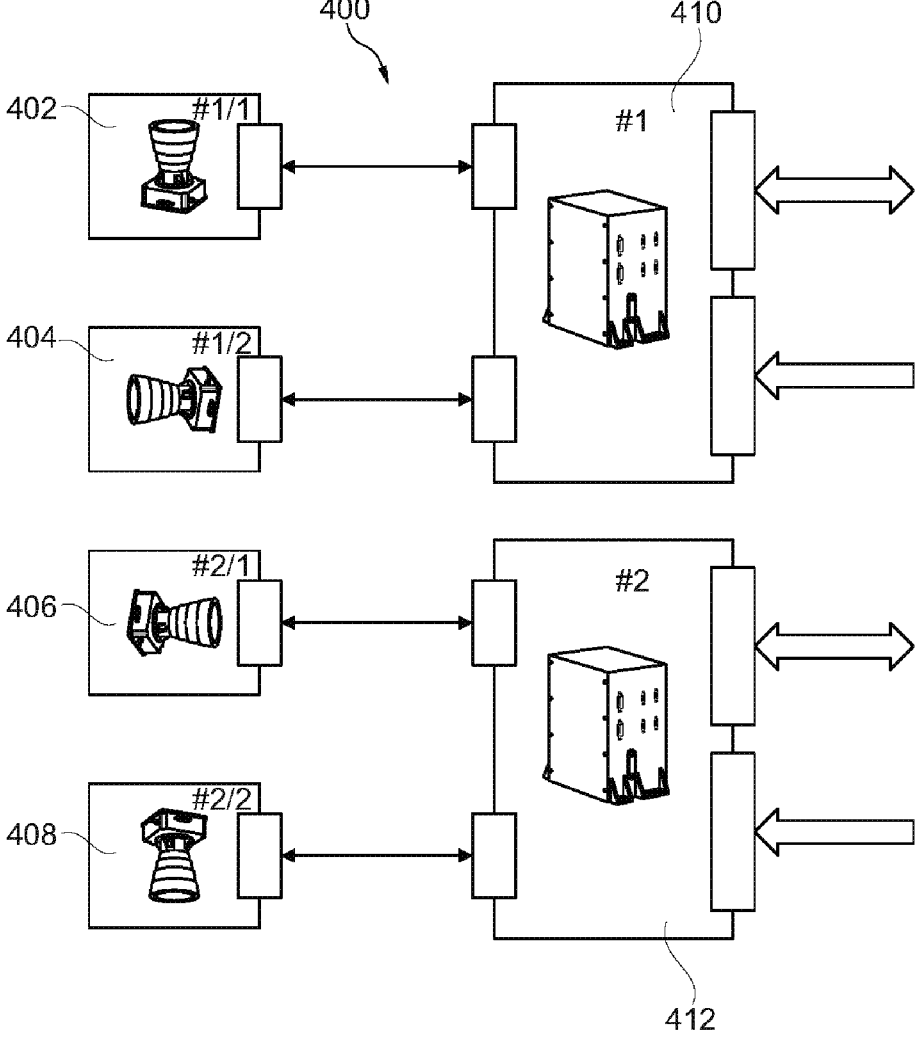

FIG. 10 shows a device 400 for determining the position of a spacecraft in space with two times two differently oriented redundant optics modules 402, 404 and 406, 408 and two redundant image processing modules 410, 412. The optics modules 402, 404 and the image processing module 410 form a first subsystem. The optics modules 406, 408 and the image processing module 412 form a second subsystem. The first subsystem and the second subsystem are in each case fully functional independently of one another and form a redundant overall system. In all other respects, reference is also made in particular to FIG. 8 and the associated description.

Figure 11:
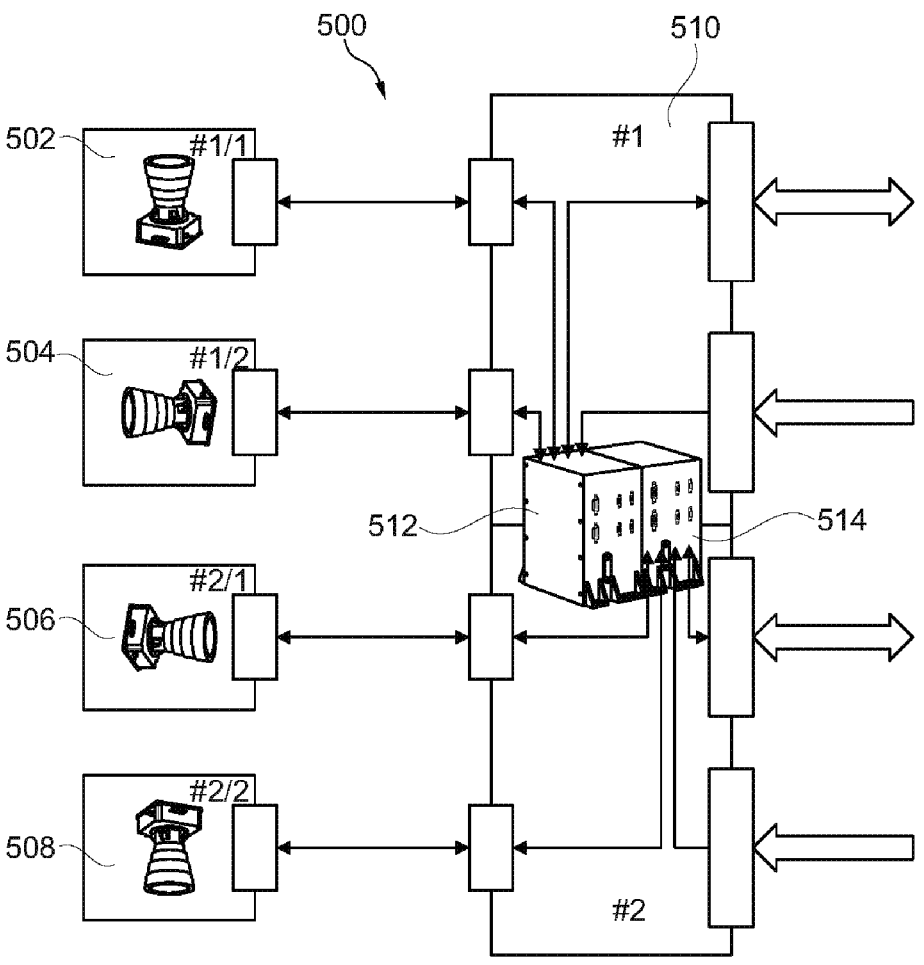

FIG. 11 shows a redundant device 500 for determining the position of a spacecraft in space with two times two differently oriented redundant optics modules 502, 504 and 506, 508 and an image processing module 510 with redundant integrated electronic circuits 512, 514. Both the circuit 512 and the circuit 514 can receive image data from all optics modules 502, 504, 506, 508, process the image data and compute a position, a rate of rotation, and a direction of rotation of the spacecraft. The circuit 512 forms a first subsystem. The circuit 514 forms a second subsystem. The first subsystem and the second subsystem are in each case fully functional independently of one another and form a redundant overall image processing module system. In all other respects, reference is also made in particular to FIG. 8 and FIG. 10 and the associated description.

Figure 12:
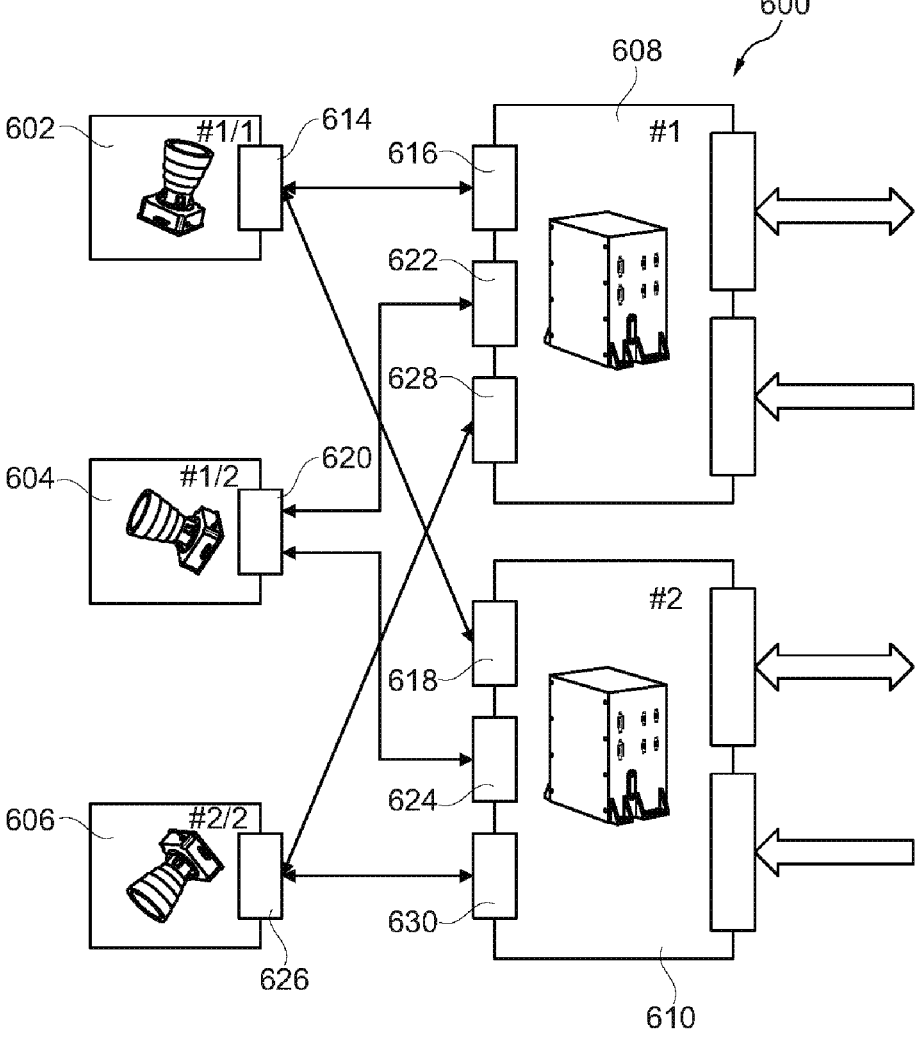

FIG. 12 shows a device 600 for determining the position of a spacecraft in space with three differently oriented and redundantly cross-connected optics modules 602, 604, 606 and two redundant image processing modules 608, 610. An interface 614 of the optics module 602 is connected to an interface 616 of the image processing module 608 and to an interface 618 of the image processing module 610 for transmitting image data, signals and/or electrical power. An interface 620 of the optics module 604 is connected to an interface 622 of the image processing module 608 and to an interface 624 of the image processing module 610 for transmitting image data, signals and/or electrical power. An interface 626 of the optics module 606 is connected to an interface 628 of the image processing module 608 and to an interface 630 of the image processing module 610 for transmitting image data, signals and/or electrical power. The optics modules 602, 604 are in each case fully functional independently of one another and form a redundant overall system. The image processing modules 608, 610 are in each case fully functional independently of one another and form a redundant overall system. In all other respects, reference is also made in particular to FIG. 8 and FIG. 10 and the associated description.

Figure 13:
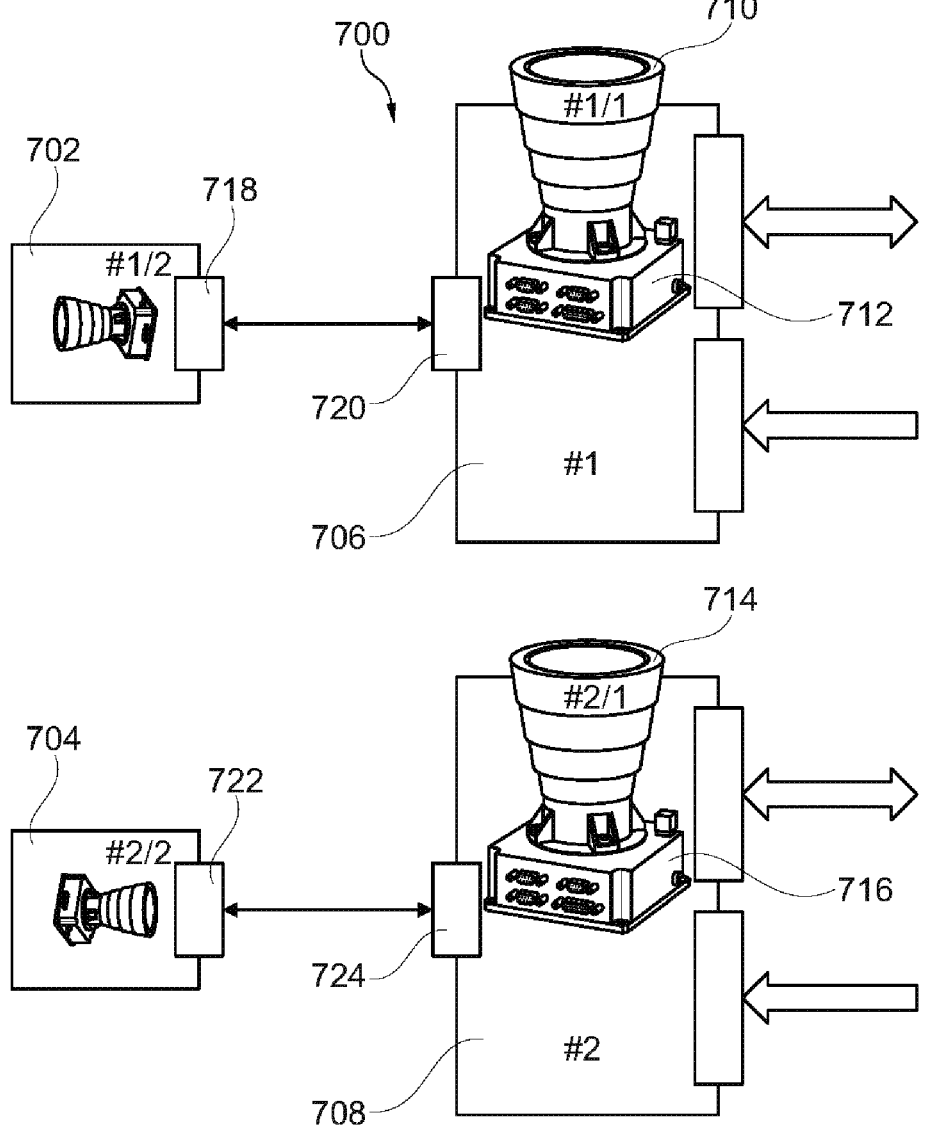

FIG. 13 shows a device 700 for determining the position of a spacecraft in space with two differently oriented external optics modules 702, 704 and two redundant integrated optics/image processing modules 706, 708. The optics/image processing module 706 has an optics section 710 and an image processing section 712. The optics section 710 and the image processing section 712 of the optics/image processing module 706 are structurally fixedly and functionally connected to one another for transmitting image data, signals and/or electrical power. The optics/image processing module 708 has an optics section 714 and an image processing section 716. The optics section 714 and the image processing section 716 of the optics/image processing module 708 are structurally fixedly and functionally connected to one another for transmitting image data, signals and/or electrical power. An interface 718 of the external optics module 702 is connected to an interface 720 of the optics/image processing module 706 for transmitting image data, signals and/or electrical power. An interface 722 of the external optics module 704 is connected to an interface 724 of the optics/image processing module 708 for transmitting image data, signals and/or electrical power. The optics/image processing module 706 and the external optics module 702 form a first subsystem. The optics/image processing module 708 and the external optics module 704 form a second subsystem. The first subsystem and the second subsystem are in each case fully functional independently of one another and form a redundant overall system. In all other respects, reference is also made in particular to FIG. 8 and FIG. 10 and the associated description.

Figure 14:
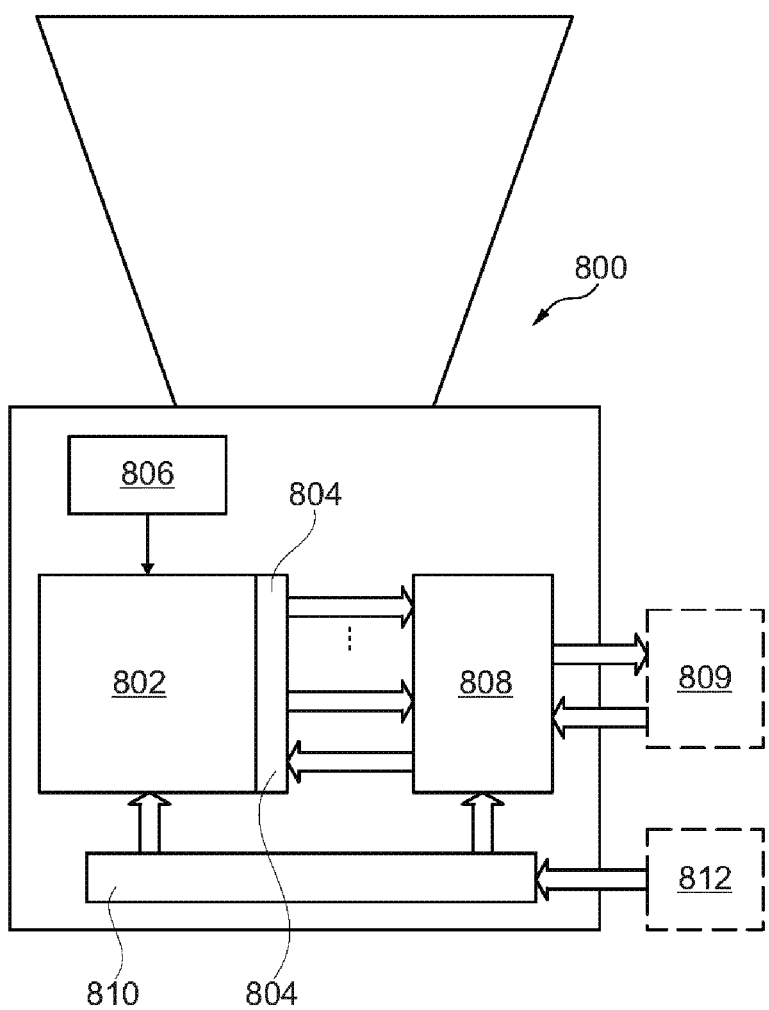

FIG. 14 shows an optics module 800, such as optics module 100, 102, 104, 202, 204, 302, 304, 306, 402, 404, 406, 408, 502, 504, 506, 508, 602, 604, 606, 702, 704, 710, 714, of a device 200, 300, 400, 500, 600, 700.

The optics module 800 has a field of view angle in the range of 15 degrees to 35 degrees, in particular a field of view angle of approximately 25 degrees, a light-sensitive sensor, for example backlit, and a high full-frame readout rate, which is achieved, for example, by using detectors with a plurality of parallel outputs, using detectors with fully integrated control of the sensor matrix, using detectors with a plurality of integrated analog-to-digital converters and/or fast interfaces for data transmission, such as LVDS, Space-Wire, SpaceFiber, Ethernet, or the like.

The optics module 800 contains the following electronic components: a detector/image sensor/optoelectronic sensor 802 with an interface 804, a clock 806, at least one signal converter 808 and/or a power conditioning unit 810. The interface 804 has at least one output for outputting data and one input for receiving control signals. The at least one signal converter 808 is designed to translate a control and the data to be output from/to a rapid external interface 809 and can be integrated into the sensor 802. The clock 806 can be integrated into the sensor 802 and/or derived from a signal from the external interface. The power conditioning unit 810 is designed to condition and distribute an externally fed power supply unit 812 and can contain filtering, voltage conversion and protection circuitry. An electronics unit for processing and distributing the fed power supply unit can optionally be fully or partially integrated into the sensor 802.

The interfaces for transmitting telemetry data and tele-command data and/or the interfaces for receiving electrical energy can also be designed with multiple, in particular dual, redundancy in all versions. Thus, a connection from/to a plurality of, in particular two, on-board computers can be effected.

The word "may" refers in particular to optional features of the invention. Accordingly, there are also further developments and/or embodiments of the invention which additionally or alternatively have the respective feature or the respective features.

If necessary, isolated features can also be selected from the combinations of features disclosed in the present case and can be used in combination with other features to delimit the subject matter of the claim, while resolving a structural and/or functional relationship that may exist between the features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE SIGNS

100 Optics module
102 Optics module
104 Optics module
106 Image processing module 108 Image data
110 Image data
112 Image data
114 Fusion solution
116 Full image data
118 Sectional image data
120 Full image data
122 Sectional image data
124 Step
126 Step
128 Step
130 Step
132 Step
134 Step
136 Circuit unit
138 Step
140 Step
142 Step
144 Step
146 Step
148 Step
150 Stellar object list
152 Processor
154 Processor
156 Processor
158 Hardware process chain
200 Device
202 Optics module
204 Optics module
206 Image processing module
208 Interface
210 Interface
212 Circuit
214 Interface
216 Interface
218 Interface
220 Interface
300 Device
302 Optics module
304 Optics module
306 Optics module
308 Image processing module
310 Interface
312 Interface
314 Interface
316 Interface
318 Interface
320 Interface
400 Device
402 Optics module
404 Optics module
406 Optics module
408 Optics module
410 Image processing module
412 Image processing module
500 Device
502 Optics module
504 Optics module
506 Optics module
508 Optics module
510 Image processing module
512 Circuit
514 Circuit
600 Device
602 Optics module
604 Optics module
606 Optics module 608 Image processing module
610 Image processing module
614 Interface
616 Interface
618 Interface
620 Interface
622 Interface
624 Interface
626 Interface
628 Interface
630 Interface
700 Device
702 Optics module
704 Optics module
706 Optics/image processing module
708 Optics/image processing module
710 Optics section
712 Image processing section
714 Optics section
716 Image processing section
718 Interface
720 Interface
722 Interface
724 Interface
800 Optics module
802 Sensor
804 Interface
806 Clock
808 Signal converter
809 Interface
810 Power conditioning unit
812 Power supply unit

What is claimed is:
1. A method for determining a position of a spacecraft in space, the method comprising:
a) receiving image data including star objects from a plurality of differently oriented optics modules carried on the spacecraft;
b) processing the received image data; and
c) computing at least one of a position, a rate of rotation, or a direction of rotation of the spacecraft from the processed image data;
wherein at least one of the steps a), b), or c) are carried out with the aid of at least one image processing module; and
wherein processing the received image data comprises at least one of:
recognizing and removing disturbances caused by solar eruptions,
disregarding disturbances caused by solar eruptions, or
eliminating disturbances caused by solar eruptions.
2. The method of claim 1 wherein at least one of steps a), b), or c) are carried out in real time.
3. The method of claim 1, wherein at least one of steps a), b), or c) are carried out for image data of the plurality of differently oriented optics modules with the aid of a common image processing module.
4. The method of claim 1, wherein:
receiving image data from a plurality of differently oriented optics modules comprises receiving image data from a plurality of differently oriented optics modules of a first optics module subsystem, and receiving image data from a plurality of differently oriented optics modules of at least one second optics module subsystem; and the first optics module subsystem and the at least one second optics module subsystem form a redundant overall optics module system.

5. The method of claim 1, wherein:

at least one of steps a), b), or c) are carried out with the aid of at least one of:

a first image processing module having at least one integrated electronic circuit, or at least one second image processing module having at least one integrated electronic circuit; and the first image processing module and the at least one second image processing module form a redundant overall image processing module system.

6. The method of claim 5, wherein:

receiving image data from a plurality of differently oriented optics modules comprises receiving image data from a plurality of differently oriented optics modules of a first optics module subsystem, and receiving image data from a plurality of differently oriented optics modules of at least one second optics module subsystem;

the first optics module subsystem and the at least one second optics module subsystem form a redundant overall optics module system; and at least one of steps a), b), or c) are carried out for the first optics module subsystem and the at least one second optics module subsystem, both with the aid of the first image processing module and the at least one second image processing module, so that a redundant overall system is formed.

7. The method of claim 1, wherein:

the at least one image processing module that carries out at least one of steps a), b), or c) comprises at least one first integrated electronic circuit and at least one second integrated electronic circuit; and the at least one first integrated electronic circuit and the at least one second integrated electronic circuit form a redundant overall circuit system.

8. The method of claim 1, wherein:

the at least one image processing module that carries out at least one of steps a), b), or c) comprises at least one of a first structurally integrated optics/image processing module or at least one second structurally integrated optics/image processing module; and the first optics/image processing module and the at least one second optics/image processing module form a redundant overall optics/image processing module system.

9. The method of claim 1, wherein at least one of:

in a full-frame mode, steps a), b), and c) are carried out on the basis of full image data; or in a window mode, steps a) and c) are carried out on the basis of cropped image data.

10. The method of claim 1, further comprising:

feeding the at least one of a position, a rate of rotation, or a direction of rotation of the spacecraft computed for each of the differently oriented optics modules in step c) to a common fusion solution.

11. The method of claim 1, wherein processing the received image data comprises at least one of:

b1) correcting an image background;

b2) binarizing a corrected background image;

b3) filtering stellar objects; or b4) segmenting stellar objects.

12. The method of claim 1, wherein at least one of steps a), b), or c) are carried out with the aid of at least one computer program, and the at least one computer program is executed with the aid of at least one integrated electronic circuit.

13. A device for determining the position of a spacecraft in space, wherein the device is designed to carry out the method of claim 1.

14. The device of claim 13, comprising:

a plurality of differently oriented optics modules; and at least one image processing module.

15. The device of claim 13, further comprising:

a first optics module subsystem with a plurality of differently oriented optics modules; and at least one second optics module subsystem with a plurality of differently oriented optics modules;

wherein the first optics module subsystem and the at least one second optics module subsystem form a redundant overall optics module system.

16. The device of claim 13, comprising:

at least one of:

a first image processing module with at least one integrated electronic circuit, or at least one second image processing module with at least one integrated electronic circuit;

wherein the first image processing module and the at least one further image processing module form a redundant overall image processing module system.

17. The device of claim 16, wherein the at least one integrated electronic circuit is universally programmable or integrated in an application-specific manner.

18. The device of claim 13, comprising:

at least one image processing module with at least one first integrated electronic circuit and at least one second integrated electronic circuit;

wherein the at least one first integrated electronic circuit and the at least one second integrated electronic circuit form a redundant overall circuit system.

19. The device of claim 13, comprising:

at least one of a first structurally integrated optics/image processing module or at least one second structurally integrated optics/image processing module;

wherein the first optics/imaging processing module and the at least one further optics/imaging processing module form a redundant overall optics/imaging processing module system.

20. A computer program product for determining a position of a spacecraft in space, the computer program product comprising program code stored on a non-transient, computer-readable medium, the program code, when executed on a computer, causing the computer to carry out the method of claim 1.

21. A method for determining a position of a spacecraft in space, the method comprising:

a) receiving image data including star objects from a plurality of differently oriented optics modules carried on the spacecraft;

b) processing the received image data; and c) computing at least one of a position, a rate of rotation, or a direction of rotation of the spacecraft from the processed image data;

wherein at least one of the steps a), b), or c) are carried out with the aid of at least one image processing module;

wherein at least one of:

in a full-frame mode, steps a), b), and c) are carried out on the basis of full image data, or in a window mode, steps a) and c) are carried out on the basis of cropped image data; and wherein:

the full-frame mode is carried out parallel in time for a plurality of optics modules, at least temporarily, or the full-frame mode is carried out for only one of the optics modules at a time.

22. A device for determining a position of a spacecraft in space, the device comprising:

a first optics module subsystem with a plurality of differently oriented optics modules;

at least one second optics module subsystem with a plurality of differently oriented optics modules;

wherein the first optics module subsystem and the at least one second optics module subsystem form a redundant overall optics module system; and at least one of:

a first image processing module with at least one integrated electronic circuit, or at least one second image processing module with at least one integrated electronic circuit;

wherein the first image processing module and the at least one second image processing module form a redundant overall image processing module system; and wherein the first optics module subsystem and the at least one second optics module subsystem are in each case connected both to the first image processing module and to the at least one second image processing module for transmitting at least one of image data, signals, or electrical power, such that a redundant overall system is formed;

the device configured to:

a) receive image data including star objects from a plurality of differently oriented optics modules carried on the spacecraft, b) process the received image data, and c) compute at least one of a position, a rate of rotation, or a direction of rotation of the spacecraft from the processed image data;

wherein at least one of the functions a), b), or c) is carried out with the aid of at least one of the first image processing module or the second image processing module.

* * * * *